United States Patent
Borghi (10) Patent No.: US 9,669,712 B2
(45) Date of Patent: Jun. 6, 2017

(54) INTUITIVE VEHICLE CONTROL

(71) Applicant: Faraday & Future Inc., Gardena, CA (US)

(72) Inventor: Cory Denis Borghi, Torrance, CA (US)

(73) Assignee: FARADAY & FUTURE INC., Gardena, CA (US)

(*) Notice: Subject to any disclaimer, the term of this patent is extended or adjusted under 35 U.S.C. 154(b) by 0 days.

(21) Appl. No.: 14/839,230

(22) Filed: Aug. 28, 2015

(65) Prior Publication Data

US 2017/0057357 A1  Mar. 2, 2017

(51) Int. Cl.
| | |
|---|---|
| G06K 7/00 | (2006.01) |
| G06K 7/10 | (2006.01) |
| E05B 81/00 | (2014.01) |
| E05B 81/76 | (2014.01) |
| B60K 37/06 | (2006.01) |
| B60R 16/027 | (2006.01) |
| B60R 25/01 | (2013.01) |
| E05F 15/75 | (2015.01) |
| G06F 3/041 | (2006.01) |
| G06F 3/042 | (2006.01) |

(52) U.S. Cl.
CPC ............ *B60K 37/06* (2013.01); *B60R 16/027* (2013.01); *B60R 25/01* (2013.01); *E05B 81/77* (2013.01); *E05F 15/75* (2015.01); *G06F 3/042* (2013.01); *G06F 3/0414* (2013.01); *G06F 3/0416* (2013.01); *B60K 2350/1036* (2013.01); *B60K 2350/921* (2013.01)

(58) Field of Classification Search
CPC combination set(s) only.
See application file for complete search history.

(56) References Cited

U.S. PATENT DOCUMENTS

2007/0182215 A1* 8/2007 Rose .................... B60R 16/005
                                                              296/211

OTHER PUBLICATIONS

Silicon Labs, Infrared Gesture Sensing AN580 (2011).
Vishay Semiconductors, VCN4020 Proximity Sensor—Gesture Control Sensor Board (Sep. 11, 2013).
Microchip, Microchips GestIC Technology, http:www.microchip.com/pagehandler/en-us/technology/gestic/products.html, accessed Aug. 19, 2015.
Peratech, QTC Clear Screenprint Ink, http://www.peratech.com/qtc-clear-screenprint-ink.html, accessed Aug. 19, 2015.

(Continued)

*Primary Examiner* — Yonel Beaulieu
(74) *Attorney, Agent, or Firm* — Finnegan, Henderson, Farabow, Garrett & Dunner, LLP (57) ABSTRACT

A vehicle including a system for intuitive control of a vehicle component is disclosed. The vehicle may include the vehicle component, a sensor unit associated with the vehicle component that is configured to detect a touch command applied to the sensor unit by a user, a controller, and a drive. The controller may be operatively coupled to the sensor unit and the drive may be coupled to the vehicle component. The controller may generate a control signal based on the touch command applied to the sensor unit and may cause the drive to alter a condition of the vehicle component in response to the control signal.

10 Claims, 7 Drawing Sheets

(56) References Cited

OTHER PUBLICATIONS

Peratech, QTC Clear 4-wire Demo Video Screenshots, https://www.youtube.com/watch?v=y9eHiT94XYU&feature=youtu.be, accessed Aug. 19, 2016.
Tapeswitch, Tapeswitch Sensing Edges, http://wwww.tapeswitch.co.uk/Sensing%20Edges, accessed Aug. 19, 2015.

* cited by examiner

| Sensor Unit | Touch Command | Altered Condition of Vehicle Component |
|---|---|---|
| Touch-sensitive film 522 | Tap once | Glass pane 516 closes completely |
| Touch-sensitive film 522 | Tap twice | Glass pane 516 opens completely |
| Touch-sensitive film 522 | Touch and hold | Tint level of glass pane 516 increases/decreases |
| Touch-sensitive film 522 | Swipe across sensor | Touch-sensitive strip 522 turns on/off |
| Touch-sensitive film 548 | Tap once | Lock mechanism 540 disengages |
| Touch-sensitive film 548 | Tap twice | Lock mechanism 540 engages |
| Camera 550 | Sweep hand upward | Glass pane 516 is raised |
| Camera 550 | Sweep hand downward | Glass pane 516 is lowered |

Fig. 7

INTUITIVE VEHICLE CONTROL

TECHNICAL FIELD

The present disclosure is directed to a vehicle control system, and particularly a system for intuitive vehicle control through touch-based haptic interfaces.

BACKGROUND

Modern vehicles have a variety of user interfaces. On even the most basic vehicle, the user controls many vehicle components. For example, headlights, windshield wipers, seat position, and mirror position may be adjusted. Windows, doors, trunks, hoods, gas caps (on an internal combustion engine vehicle or a hybrid vehicle), and electrical charge ports or access panels can be opened and closed. Temperature and audio systems are also adjustable. Additionally, more advanced vehicles may feature global positioning systems, hands-free calling, and even passenger entertainment systems that can be controlled or otherwise interacted with by the vehicle occupants.

Conventional vehicles allow control of these components through mechanical and electrical buttons and switches. For example, the user presses a button on the door to open a window, or turns a handle to switch headlights on. The position and style of these interfaces varies by vehicle brand and model. As a result, the user must spend time and effort to learn to use the interfaces in a new vehicle, many of which may not be intuitive, and which generally cannot be customized. This may prove distracting and annoying for vehicle drivers and passengers, especially when the vehicle is a rental car that the occupants are not familiar with. Accordingly, there exists a need for an improved control interface for use in vehicles.

The disclosed system is directed to addressing one or more of the problems set forth above and/or other problems of the prior art, and to providing an improved control system through intuitive haptic interfaces.

SUMMARY

In one aspect, the present disclosure is directed to a system for intuitive control of a vehicle component. The system may have a sensor unit associated with the vehicle component. The sensor unit may be configured to detect a touch command applied to the sensor unit by a user. The vehicle control system may include a controller coupled to the sensor unit and a drive coupled to the vehicle component. The controller may be configured to generate a control signal based on the touch command applied to the sensor unit and cause the drive to alter a condition of the vehicle component in response to the control signal.

In another aspect, the present disclosure is directed to a vehicle including a system for intuitive control of a vehicle component. The vehicle may include the vehicle component, a sensor unit associated with the vehicle component, a controller, and a drive. The sensor unit may be configured to detect a touch command applied to the sensor unit by a user. The controller may be operatively coupled to the sensor unit and the drive may be coupled to the vehicle component. The controller may be configured to generate a signal based on the touch command applied to the sensor unit and cause the drive to alter a condition of the vehicle component in response to the control signal.

In another aspect, the present disclosure is directed to a method of intuitively controlling a vehicle component. The method may include sensing a touch command applied to a sensor unit by a user. The method may also include generating, by a controller, a control signal based on the touch command and altering the condition of the vehicle in response to the control signal.

In another aspect, the present disclosure is directed to a non-transitory computer-readable medium. Computer instructions stored on the computer-readable medium, when executed by a processor, may perform a method of controlling a vehicle component. The method of intuitively controlling the vehicle component may include receiving a signal corresponding to a touch command applied to a sensor unit by a user and interpreting the signal. The method of intuitively controlling the vehicle component may also include generating a control signal based on the signal corresponding to the command applied to the sensor unit by the user and altering a condition of the vehicle component in response to the control signal.

DETAILED DESCRIPTION

FIGS. 1 and 3-6 illustrate various exemplary control systems. These control systems may be implemented in a vehicle, not shown. The vehicle may be of any type. For example, the vehicle may be a car, truck, semi-truck, motorcycle, plane, train, moped, scooter, or other means of transportation. Furthermore, the vehicle may use any type of powertrains. For example, the vehicle may be an electric vehicle, a fuel cell vehicle, a hybrid vehicle or a conventional internal combustion engine vehicle. The vehicle may have a number of components that may be controlled by the disclosed control system, including windows, door lock mechanisms, headlights, lamps (such as overhead lamps, reading lamps, or map lamps), windshield wipers, radio controls (for example, power controls, volume controls, and station tuners), multimedia system controls (such as power controls, volume controls, play, pause, rewind, fast forward, stop, and other controls), trunks, hoods, gas tank covers (for an internal combustion engine vehicle or a hybrid vehicle), an electrical charge port or access panel, global positioning systems, seat position controls, etc.

Figure 1:
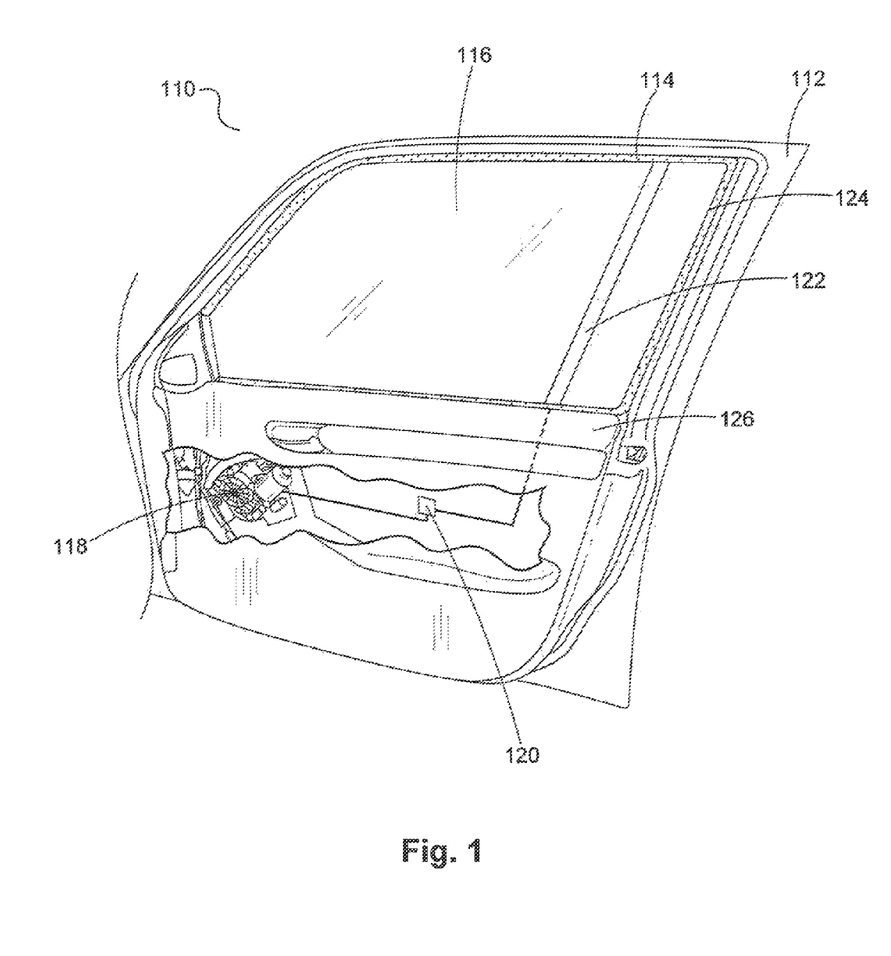
FIG. 1 is a diagrammatic illustration of a first exemplary control system for controlling a vehicle window.

FIG. 1 is a diagrammatic illustration of a first exemplary control system 110. In the illustrated embodiment, passenger door 112 may include window 114. Window 114 may include glass pane 116, an exemplary vehicle component. Glass pane 116 may be configured to be raised and lowered by drive 118. Drive 118 may be controlled by controller 120, which may be operatively connected to a sensor unit. A sensor unit may be a unit configured to sense a touch command performed by a user. For example, the sensor unit used in control system 110 may be a touch-sensitive sensor 122 (such as a touch-sensitive film or screen).

Touch-sensitive sensor 122 may detect the touch command. The touch command may include tapping the sensor unit, touching the sensor unit, pressing the sensor unit, swiping a user's finger or other object along the sensor unit. The touch command may also include gestures or movements performed proximate the sensor unit. As used consistently throughout this disclosure, the touch command does not include pressing a mechanical button or switch. The touch command may be applied by the user's finger, or may be applied by another object.

Exemplary control systems may employ a set of pre-determined touch commands corresponding to different control signals and resulting in different alterations to the vehicle component. It is also contemplated that particular touch commands may be selected by the user to accommodate particular needs or preferences. For instance, a user suffering from arthritis may choose to have tapping-based commands.

Touch-sensitive sensor 122 may be disposed on glass pane 116, or proximate glass pane 116, or may be integrally formed with glass pane 116. If disposed on glass pane 116, touch-sensitive sensor 122 may be disposed on only a portion of glass pane 116, or may cover all of glass pane 116. In addition or alternatively, touch-sensitive sensor 122 may be positioned along window seal 124. Touch-sensitive sensor 122 may be of any desired dimension and may be placed anywhere on or proximate glass pane 116.

The positioning of touch-sensitive sensor 122 may be dictated by stylistic concerns or by user preferences. For instance, touch-sensitive sensor 122 may be movable, allowing the user to select where that touch-sensitive sensor 122 should be positioned. This allows, for example, users with small children to position touch-sensitive sensor 122 out of their children's reach.

Touch-sensitive sensor 122 may be opaque or textured so that a user can easily identify touch-sensitive sensor 122, or transparent to avoid impacting the user's view. Exemplary materials for touch-sensitive sensor 122 may include QTC™ Clear Screenprint Ink, QTC™ Clear 4-Wire, Tapeswitch® Sensing Edges, or any other touch-sensitive materials suitable for the purpose.

Touch-sensitive sensor 122 may be operably connected to controller 120. For example, touch-sensitive sensor 122 and controller 120 may be connected by wired connection, or may communicate wirelessly via infrared, Bluetooth®, wireless network, radio, or other near-field communication system.

In alternative embodiments, one or more alternative sensor units, such as light- or touch-sensitive sensors, cameras, ultrasound sensors, infrared sensors, or other sensors operable to sense a touch command, may be substituted for touch-sensitive sensor 122.

Controller 120 may be configured to generate a control signal in response to a touch command applied to touch-sensitive sensor 122. Although controller 120 is depicted in FIG. 1 as within the paneling 126 of passenger door 112, the controller may be alternatively positioned elsewhere in the vehicle. Controller 120 is described in more detail in connection with FIG. 2.

The control signal generated by controller 120 may cause drive 118 to raise or lower glass pane 116. Drive 118 may be a motor configured to raise and lower glass pane 116. Drive 118 may be configured to control other conditions of the window. For example, in an alternative embodiment, drive 118 may also control the tint of the window. In that embodiment, drive 118 may instead be a system including thermochromic wiring disposed in glass pane 116 and a power source configured to provide a current to the thermochromic wiring in order to control the tint of the glass. In that embodiment, a user might press and hold the glass pane in order to darken the tint of the window and then press and hold again to lighten the tint of the window. Alternatively, the user might tap once to begin darkening or lightening the tint of the window and tap again when the window is at the desired tint.

In a further alternative embodiment, control system 110 may have multiple drives. These drives may be controlled by a single sensor unit and controller, or may be controlled by multiple sensor units and a single controller, or may be controlled by multiple sets of sensor units and controllers, or any variation thereof. For example, a second touch-sensitive sensor may be incorporated in control system 110. A touch command applied to this second touch-sensitive sensor may send a signal to controller 120 or to a second controller separate from controller 120, and may cause controller 120 or the second controller to generate a control signal to a second drive, in order to control another condition of glass pane 116, such as tint. Alternatively, the second sensor unit and second drive may control the condition of a different vehicle component.

In the illustrated embodiment of FIG. 1, a user may apply a touch command to touch-sensitive sensor 122. A set of pre-determined touch commands corresponding to different control signals and resulting in different alterations to the vehicle component may be employed.

For example, a user may swipe a finger upwards along touch-sensitive sensor 122 to raise glass pane 116, and swipe downwards along touch-sensitive sensor 122 to lower glass pane 116. Alternatively, the user may tap touch-sensitive sensor 122 once to lower glass pane 116 and twice to raise glass pane 116. These control functions may be pre-programmed in controller 120, such that a user may choose to either tap touch-sensitive sensor 122 or swipe downwards along touch-sensitive sensor 122 to lower glass pane 116.

Touch-sensitive sensor 122 may sense the touch command and generate a signal indicative of the touch command. Controller 120 may be configured to receive the signal from touch-sensitive sensor 122 and interpret the touch command from the signal. Controller 120 then may generate a control signal based on the touch command, which may cause the drive to alter the condition of the vehicle component (e.g., glass pane 116), here by raising or lowering the glass pane 116.

Multiple sensor units may be used to control a signal drive. For example, a sensor unit in the front cabin of the car and the back cabin of the car may both be used to control glass pane 116, allowing multiple passengers to easily control different components. Similarly, multiple sensor units may be used to control different conditions of a single vehicle component via a single drive.

Figure 2:
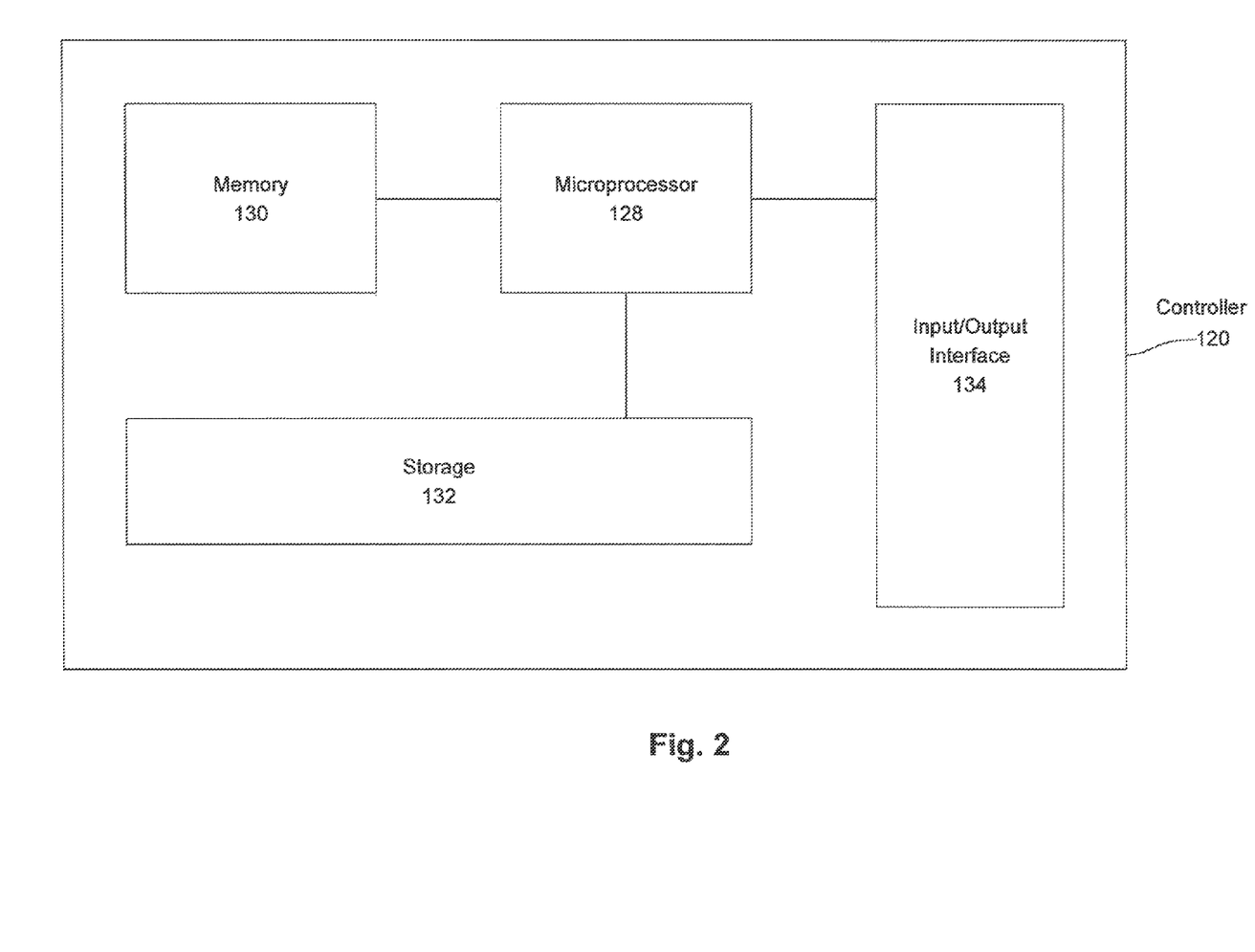
FIG. 2 is a block diagram illustrating an exemplary controller that may be used in the control system of FIG. 1.

FIG. 2 is a block diagram illustrating an exemplary controller 120. Controller 120 may include microprocessor 128, memory 130, storage 132, and input/output interface 134. Controller 120 may include additional or fewer components than those shown in FIG. 2, in different embodiments. Controller 120 may be configured as a separate controller for vehicle component control or as a shared controller that also performs other functions unrelated to vehicle component control.

Microprocessor 128 may include any appropriate type of general-purpose or special-purpose microprocessor, digital signal processor, or microcontroller. Exemplary processors for use in the control system include the Microchips GestIC™ product line. Microprocessor 128 may be configured to receive signals based on touch commands applied to a sensor unit, for example touch-sensitive sensor 122. Microprocessor 128 may interpret signals received from the sensor unit and generate a control signal which causes a drive to alter a condition of the vehicle component associated with the sensor unit, in this embodiment glass pane 116 and touch-sensitive strip 122. Microprocessor 128 may be configured to receive signals from multiple sensor units and/or may be configured to generate control signals to multiple drives.

Memory 130 may provide temporary storage for controller 120. Memory 130 may include one or more memory devices including, but not limited to, a ROM, a flash memory, a dynamic RAM, a static RAM or any other suitable memory device.

Storage 132 may provide relatively long-term storage for controller 120. Storage 132 may comprise a hard drive, optical disk, solid state drive, or flash memory. Alternatively or in addition, storage 132 may comprise USB drives, memory cards, or other portable storage, or any other non-transitory computer-readable medium. One aspect of the disclosure is directed to a non-transitory computer-readable medium, which may store computer instructions that when executed by one or more processors may cause a system to perform operations. These operations may include identifying a touch command, determining the corresponding control signal, and sending the correct control signal to the drive. In some embodiments, the non-transitory computer-readable medium may be memory 130 or storage 132. For example, storage 132 may store computer instructions, which when executed by microprocessor 128, cause controller 120 to interpret a received signal corresponding to a touch command applied to a sensor unit, the illustrated touch-sensitive sensor 122, by a user, and generate a control signal which may cause drive 118 to alter a condition of a glass pane 116.

Where storage 132 is portable, multiple users may store individual preferences in storage 132. Storage 132 may be portable and may be plugged into a different vehicle, allowing users to personalize how touch commands are interpreted.

Input/output interface 134 may connect controller 120 to drive 118 and a sensor unit (e.g., touch-sensitive sensor 122). Again, multiple drives and/or multiple sensor units may be connected to controller 120. Alternatively, only one drive and one sensor unit may be connected to controller 120.

In exemplary embodiments, controller 120 may be configured to recognize and interpret a plurality of different signals corresponding to a plurality of pre-determined touch commands. Controller 120 may recognize the signal and select the correct control signal from among a plurality of pre-determined control signals. The selected control signal may direct drive 118 to perform the alteration corresponding to the touch command given by the user.

Figure 3:
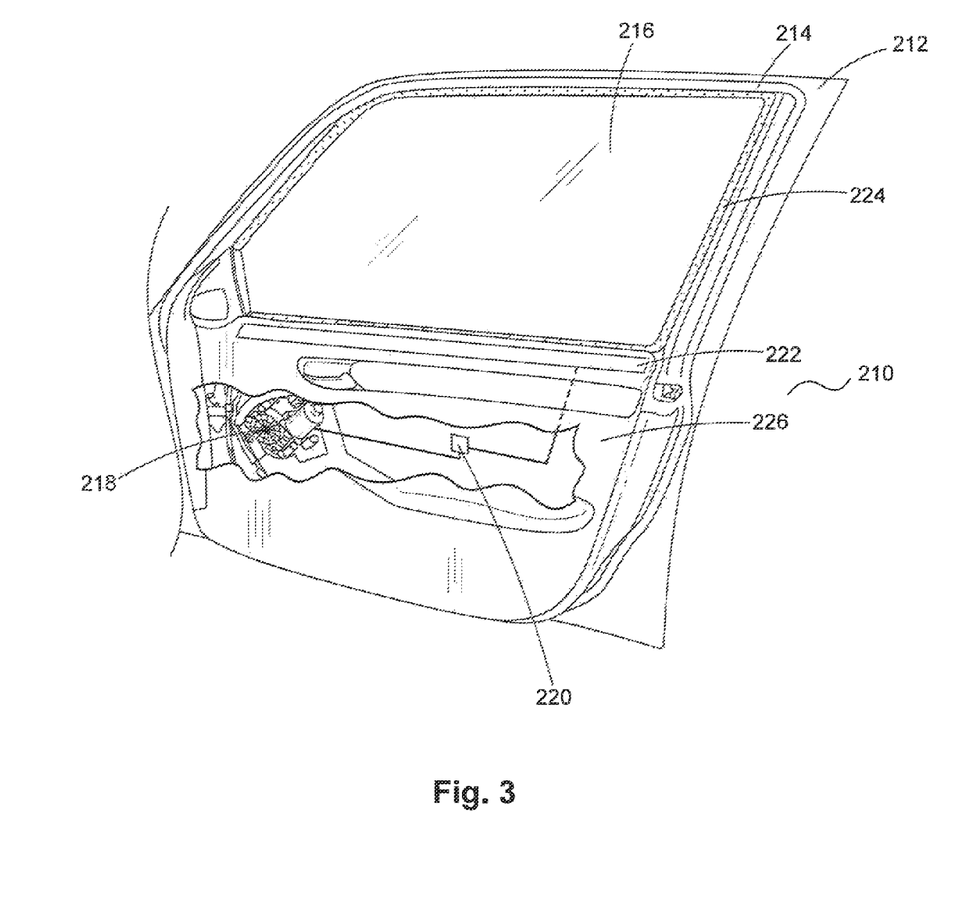
FIG. 3 is a diagrammatic illustration of a second exemplary control system for controlling a vehicle window.

FIG. 3 a diagrammatic illustration of a second exemplary control system 210 for controlling a vehicle window. Components similar to those found in control system 110 are identified with similar reference numerals. To avoid duplicative description, only those components different from those found in control system 110 are described in detail. As shown, passenger door 212 may include window 214 and paneling 226. Window 214 may include glass pane 216, an exemplary vehicle component. Window 214 may also include window seal 224. Glass pane 216 may be configured to be raised and lowered by drive 218. Drive 218 may be controlled by controller 220, which may be operatively connected to a sensor unit, in this case touch-sensitive sensor 222.

Control system 210 differs from control system 110 in the positioning of the sensor unit. In this embodiment, touch-sensitive sensor 222 may be disposed proximate glass pane 216 on paneling 226. Here, touch-sensitive sensor 222 may be depicted as a strip running horizontally along paneling 226 for the whole length of glass pane 216. However, touch-sensitive sensor 222 may be of any desired dimension and may be placed anywhere proximate window 214.

The operation of control system 210 may be similar to control system 110. The user may swipe a finger forward along touch-sensitive sensor 222 in order to raise glass pane 216 and swipe backwards along touch-sensitive sensor 222 to lower glass pane 216. Alternatively or in addition, the user may tap one portion of touch-sensitive sensor 222 to raise glass pane 216 and tap another portion of touch-sensitive sensor 222 in order to lower glass pane 216.

Figure 4:
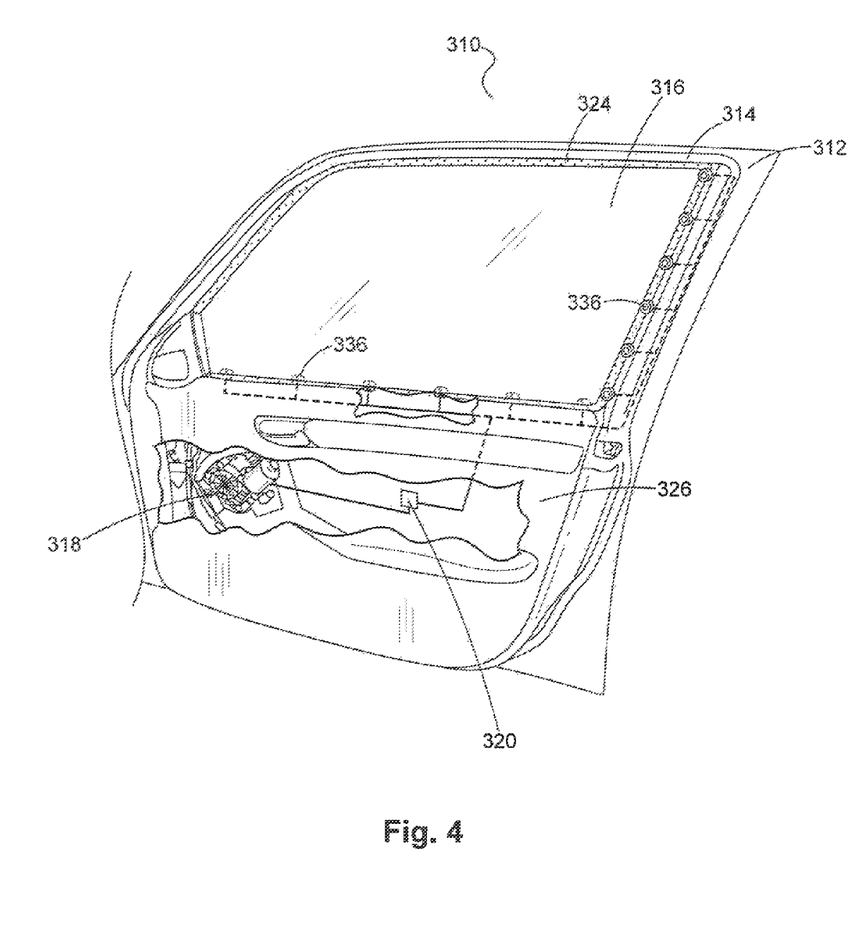
FIG. 4 is a diagrammatic illustration of a third exemplary control system for controlling a vehicle window.

FIG. 4 is a diagrammatic illustration of a third exemplary control system 310 for controlling a vehicle window. Components similar to those found in control system 110 and control system 210 are identified with similar reference numerals. To avoid duplicative description, only those components different from those found in control system 110 and control system 210 are described in detail. As shown, passenger door 312 may have window 314 and paneling 326. Window 314 may include glass pane 316, an exemplary vehicle component. Window 314 may also include window seal 324. Glass pane 316 may be configured to be raised and lowered by drive 318. Drive 318 may be controlled by controller 320, which may be operatively connected to a sensor unit, in this case a plurality of light-sensitive sensors 336.

Light-sensitive sensors 336 may detect a touch command. As shown in FIG. 4, the light-sensitive sensors 336 may be disposed around the edge of window 314. Here, light-sensitive sensors 336 may be positioned around two edges of window 314, but in alternative embodiments light-sensitive sensors 336 may be positioned around a single edge of window 314 or all four edges of window 314. In addition or alternatively, additional light-sensitive sensors 336 may be used, or that fewer, or even one, light-sensitive sensors 336 may be used as the sensor unit.

The number and positioning of light-sensitive sensors 336 may be dictated by stylistic concerns, by user preferences, or by the touch commands used. For example, touch commands based solely on tapping may require fewer light-sensitive sensors 336.

As depicted, light-sensitive sensors 336 may be wired together and coupled to processor 320 by hard wiring beneath paneling 326. In alternative embodiments light-sensitive sensors 336 may communicate wirelessly via infrared, Bluetooth®, wireless network, radio, or other near-field communication system. In addition, light-sensitive sensors 336 may be independent sensor units or may operate in concert as a single sensor unit.

Alternatively, light-sensitive sensors 336 may be movable, allowing the user to select where that light-sensitive sensors 336 should be positioned. This allows, for example, users with small children to position light-sensitive sensors 336 out of their children's reach. Alternatively, light-sensitive sensors 336 may be integrally formed with paneling 326, seal 314, or glass pane 316. Light-sensitive sensors 336 may be raised or may be flush with paneling 326, seal 314, or glass pane 316. Exemplary light-sensitive sensors 336 include Silicon Labs Si114x proximity and ambient light sensor products and Vishay Semiconductors VCNL4020 Proximity Sensors.

In alternative embodiments, one or more alternative sensor units, such as touch-sensitive films, touch-sensitive screen, touch-sensitive sensors, cameras, ultrasound sensors, infrared sensors, or other sensors operable to sense a touch command, may be substituted for light-sensitive sensors 336.

Light-sensitive sensors 336 may be operably connected to controller 320. Operation of control system 310 may be similar to the operation of control system 110 and control system 210. A user may tap a particular light-sensitive sensor 336 in order to raise glass pane 316. Alternatively or in addition, a user may waive their hand in front of a group of light-sensitive sensors 336 to alter the tint of glass pane 316.

Figure 5:
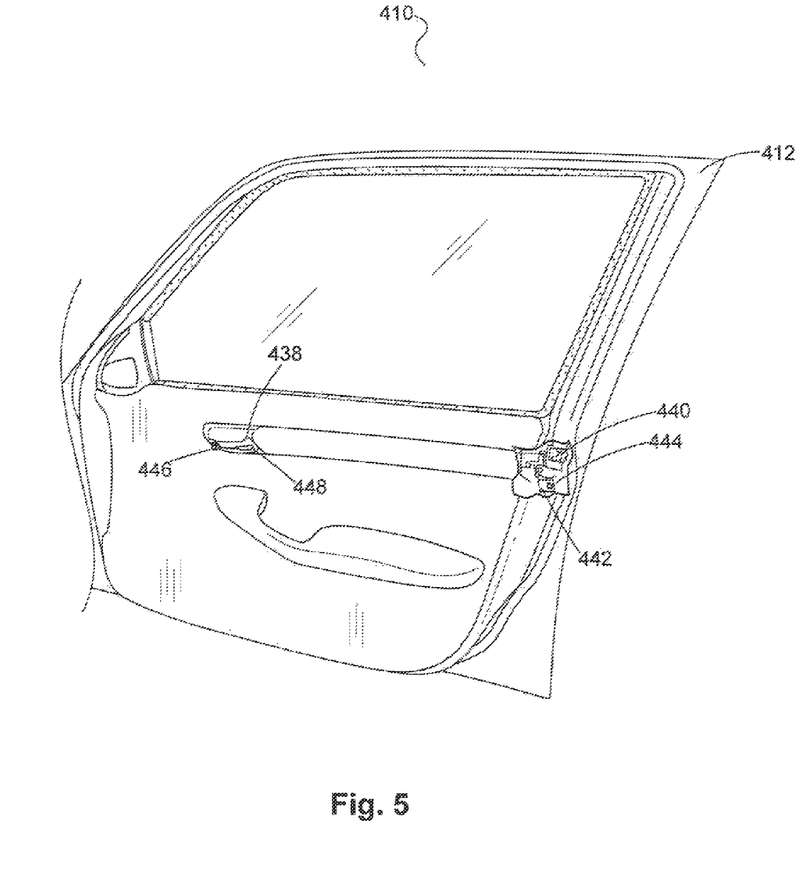
FIG. 5 is a diagrammatic illustration of an exemplary control system for controlling a vehicle door lock.

FIG. 5 is a diagrammatic illustration of a fourth exemplary control system 410 for controlling a vehicle door lock. Components similar to those found in the previously disclosed control systems are identified with similar reference numerals. To avoid duplicative description, only those components different from those found in the previously disclosed control systems are described in detail.

As shown in FIG. 5, passenger door 412 may include paneling 426, handle 438, and a drive, here lock mechanism 440. Lock mechanism 440 may be controlled by controller 442, which may be operatively connected to a sensor unit, here touch-sensitive sensor 448, via near-field communication transmitters 444 and 446.

Touch-sensitive sensor 448 detects a touch command. Touch-sensitive sensor 448 may have properties similar to touch-sensitive sensor 122 and touch-sensitive sensor 222.

In this embodiment, touch-sensitive sensor 448 may be disposed on a portion of handle 438 and conform to the contour of handle 438. However, touch-sensitive sensor 448 may be of any desired dimension and may be placed anywhere proximate handle 438. Alternatively, handle 438 may be omitted, and touch-sensitive sensor 448 may be placed anywhere on paneling 426.

Touch-sensitive sensor 448 may be operably connected to controller 442. Touch-sensitive sensor 448 and controller 442 may be connected wirelessly, as shown in FIG. 4. As illustrated, near-field communications transmitter 444 may be operably connected to controller 442 and may communicate with near-field communications transmitter 446, which may be operably connected to touch-sensitive sensor 448. Transmitter 444 and transmitter 446 may communicate wirelessly via infrared, Bluetooth®, wireless network, radio, or other near-field communication system. Alternatively, touch-sensitive sensor 448 and controller 442 may be connected by a wired connection.

Controller 442 may be configured to generate a control signal in response to a touch command applied to touch-sensitive sensor 448. Depicted here disposed within the paneling 426 of passenger door 412, controller 442 may alternatively be positioned elsewhere in the vehicle. Controller 442 shares attributes of controller 120, as depicted in FIG. 2.

The control signal generated by controller 442 may cause lock-mechanism 440 to engage or disengage. In alternative embodiments, the control signal may control "child lock" (e.g., turning the lock mechanism itself on or off to prevent the door from being unlocked) or other features.

Operation of control system 410 may be similar to the previously disclosed systems. To use the control system, a user may apply a touch command to touch-sensitive sensor 448. For example, a user may engage lock mechanism 440 by running their hand forward along touch-sensitive sensor 448, locking the door. And the user may disengage lock mechanism 440 by running their hand backward alone touch-sensitive sensor 448, unlocking the door. Alternatively, the user may tap touch-sensitive sensor 448 once to engage lock mechanism 440 and twice to disengage lock mechanism 440. These functions may be implemented in the same system, such that a user may use multiple different touch commands to achieve a particular result.

Figure 6:
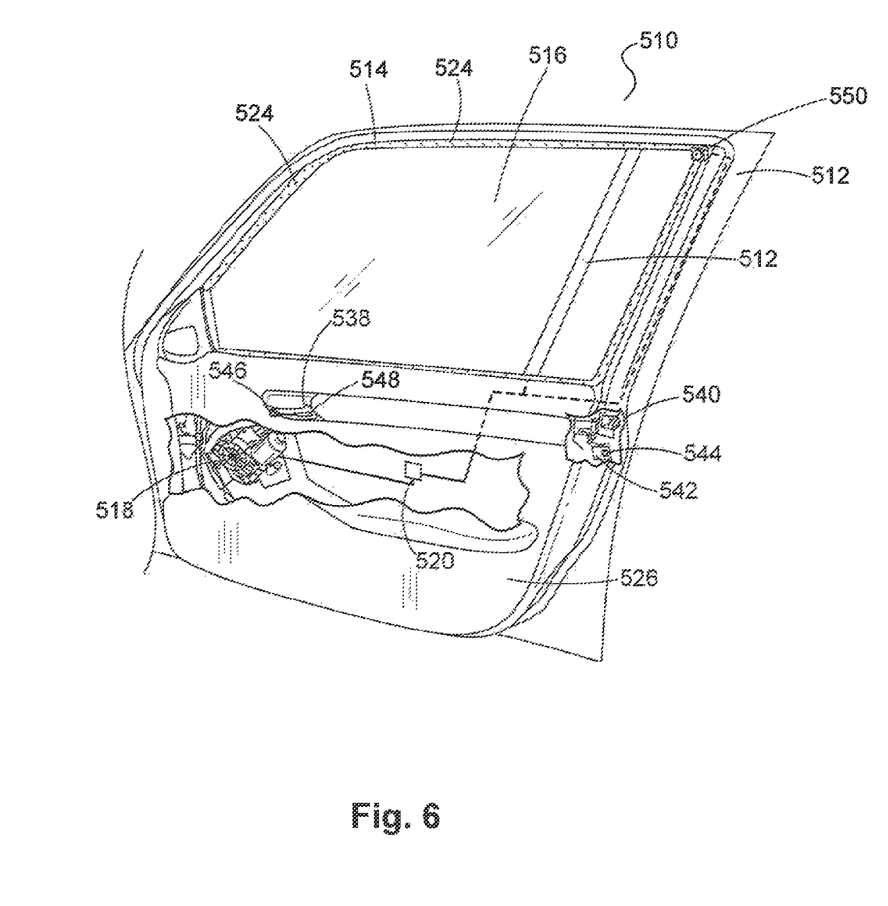
FIG. 6 is a diagrammatic illustration of an exemplary control system for controlling multiple vehicle components.

FIG. 6 is a diagrammatic illustration of a fifth exemplary control system 510 for controlling multiple vehicle components. Components similar to those found in the previously disclosed control systems are identified with similar reference numerals. To avoid duplicative description, only those components different from those found in the previously disclosed control systems are described in detail.

As shown, passenger door 512 may include window 514, paneling 526, handle 538, and lock mechanism 540.

Window 514 may include glass pane 516, seal 524, and drive 518, here a motor configured to raise and lower glass pane 516. Touch-sensitive sensor 522 may be disposed on glass pane 516, and may be operably connected to controller 520. Camera 550 may be disposed on seal 524. Camera 550 may also be connected to controller 520.

Touch-sensitive sensor or screen 548 may be disposed on handle 538. Near-field communications transmitter 546 may be operably connected to touch-sensitive sensor or screen 548, and may communicate with near-field communications transmitter 544, which may be operably connected to controller 542. Controller 542 may be configured to send a control signal to lock mechanism 540.

Touch-sensitive sensor (film or screen) 522, controller 520, and glass pane 516 may operate together as disclosed with regard to control system 110. Alternatively, touch-sensitive sensor or screen 522, controller 520, and glass pane 516 may operate together in a variety of alternative configurations, as previously disclosed. Similarly, touch-sensitive sensor or screen 548, controller 542, lock mechanism 540, and near-field communications transmitters 544 and 546 may operate together as disclosed with regard to control system 410 or the alternative configurations already disclosed. Controller 520 and controller 542 may be separate controllers, or may be implemented as a single controller.

In addition, control system 510 may include an additional sensor unit, camera 550. Camera 550 may be operative to detect a touch command of the user. The touch command may include tapping the sensor unit, touching the sensor unit, pressing the sensor unit, swiping a user's finger or other object along the sensor unit, as previously disclosed. The touch command may also include gestures or movements performed proximate the sensor unit, within the "view" of camera 550. Camera 550 may be used to recognize particular users in order to allow the user to issue commands or to facilitate recognition of user-specific touch commands.

Camera 550 may be disposed on an upper corner of seal 524. Camera 550 may be integrally formed with seal 524, and may be flush with seal 524 or raised. Camera 550 may be placed elsewhere on window 514 or paneling 526, or may be placed elsewhere in the vehicle, for example on a dashboard or console. Camera 550 may be fixed in place, but in alternative embodiments camera 550 may be movable, allowing the user to select where camera 550 is positioned.

Camera 550 may be connected to controller 520. As with touch-sensitive sensor or screen 522, camera 550 and controller 520 may be connected by wired connection, as shown in FIG. 6, or may communicate wirelessly via infrared, Bluetooth®, wireless network, radio, or other near-field communication system.

When the user applies a touch command to camera 550, the resulting control signal generated by controller 520 may cause drive 518 to alter a condition of glass pane 516, as previously disclosed.

In alternative embodiments, control system 510 may have additional drives. These drives may be controlled by a single sensor unit and controller, or by multiple sensor units and a single controller, or by multiple sets of sensor units and controllers, or any variation thereof. For example, light-sensitive sensors may be incorporated in control system 510. A touch command applied to the light-sensitive sensors may send a signal to controller 520, controller 542, or to a third controller, causing controller 520, controller 542, or the third controller to generate a control signal to a different drive, in order to control another condition of glass pane 516 or lock mechanism 540. Alternatively, the light-sensitive sensors and third drive may control the condition of a different vehicle component.

The operation of control system 510 is similar to the operation of previously disclosed embodiments. A user may apply a touch command to touch-sensitive sensor or screen 522, touch-sensitive sensor or screen 548, or camera 550.

Figure 7:
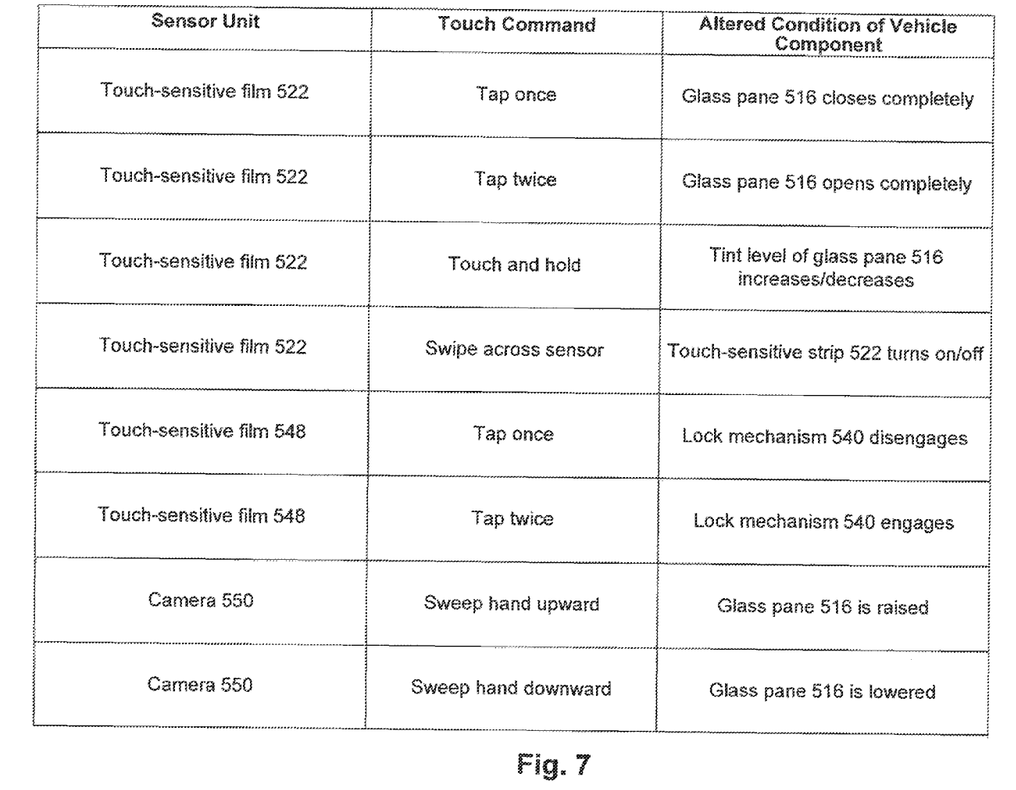
FIG. 7 is a chart listing an exemplary set of touch commands for use with the exemplary control system of FIG. 6.

FIG. 7 illustrates an exemplary set of pre-determined touch commands that may be used in conjunction with the exemplary control system of FIG. 6.

For each sensor unit, touch-sensitive strip 522, touch-sensitive strip 548, and camera 550, a list of touch-commands may be provided and pre-programmed in controller 520 and/or controller 542. For example, the list may be pre-programmed and stored in controller 520 and/or controller 542 as a look-up table. Each touch command may cause the controller (controller 520 or controller 542) to send a control signal to the relevant drive to achieve the desired result. For example, by holding a touch to touch-sensitive strip 522, the user may cause the tint of glass pane 516 to change.

In addition, as shown in FIG. 7, touch commands may be used to turn sensor units on and off. For instance, swiping across touch-sensitive strip 522 may cause touch-sensitive strip 522 to send a signal to controller 520, which controller 520 recognizes as an "off" command. Until the "on command" is received, controller 520 will not send commands to drive 518. This provides a potentially useful safety feature for users transporting children, pets, or heavy objects. By turning "off" touch-sensitive strip 522, a user can prevent pets or small children from accidentally opening and closing glass pane 516.

Based on the sensor unit chosen and the touch command applied, a signal may be sent from the sensor unit to the relevant controller. The controller receives and interprets the signal, and sends a control signal to drive 518 or lock mechanism 540. In response to the control signal, the condition of the vehicle component associated with the particular sensor unit may be altered.

For example, if the user applies a touch command to touch-sensitive strip 522 or camera 550, a signal may be sent to controller 520. Controller 520 may receive and interpret the signal, and generate a control signal to drive 518. This may cause glass pane 516, the vehicle component associated with touch-sensitive strip 522 and camera 550, to be raised or lowered. Alternatively, in an embodiment where drive 518 controls the tint of glass pane 516, the control signal may cause the tint of glass pane 516 to be lightened or darkened.

Similarly, if the user applies a touch command to touch-sensitive strip 548, controller 542 may receive a signal from touch-sensitive sensor or screen 548, interpret the signal, and generate a control signal to the drive, here lock mechanism 540, based on the touch command. The control signal may direct lock mechanism 540 to alter the condition of lock mechanism 540—in this embodiment by engaging or disengaging lock mechanism 540. In an alternative embodiment, the control signal may turn "child lock" on or off.

The disclosed control system may be implemented both in new vehicles and as a stand-alone or portable system. For instance, the user may install a controller and a sensor unit to connect with an existing drive, or install a new control system to an existing vehicle when replacing a particular vehicle component. Furthermore, particular components of the system (e.g., sensor units or the vehicle components themselves) may be replaced without disturbing the remaining system components.

Additionally, the disclosed control system may be used in tandem with conventional electrical or mechanical controls. For example, the control system may be used to control only some of the vehicle components in the vehicle, or two different systems may be used to control a signal vehicle component (for instance, in order to have a mechanical override option).

The disclosed systems may be utilized for a variety of vehicle components other than the vehicle window and door lock as described above. For example, a sensor unit located on the vehicle dashboard may be used to control the operation of headlights. Touch commands may be used to control whether the headlights are on or off, as well as the brightness level of the headlights. Similarly, a sensor unit positioned on the windshield or the dashboard may be used to control whether windshield wipers were on or off, their speed, and whether wiper fluid is used. In addition, a sensor unit, or multiple sensor units, disposed on the console or adjacent passenger seats may be used to control the power, volume, station, or track choice on a radio, or the power, volume, and/or other controls (e.g., play, pause, fast forward, stop etc.) on a multimedia or passenger entertainment system, hands-free call system, or global positioning system. The disclosed systems may also be used to control seat position, using a sensor unit on or proximate a seat to raise, recline, and/or adjust the position of the seat forward, back, or side to side. In addition, the disclosed systems may be used to control whether a gas tank cover (for an internal combustion vehicle or a hybrid vehicle), an electrical charge port or access panel, hood, or trunk was open or closed, using sensor units disposed either within the car, or on the exterior of the car proximate these features.

Though described with reference to vehicle components, the disclosure is not limited to use in vehicles. For example, the disclosed systems may be applied to a garage door opening interface, with sensor units positioned both inside and outside of the vehicle for raising and lower the garage door. The disclosed systems may find further use in household and office environments, in which intuitive control of home or office components (such as windows, doors, lights, or appliances) is desired.

It will be apparent to those skilled in the art that various modifications and variations can be made to the vehicle control system. Other embodiments will be apparent to those skilled in the art from consideration of the specification and practice of the disclosed vehicle control system. It is intended that the specification and examples be considered as exemplary only, with a true scope being indicated by the following claims and their equivalents.

What is claimed is:

1. A system for intuitive control of a vehicle component, comprising: a sensor unit associated with the vehicle component, the sensor unit configured to detect a touch command applied to the sensor unit by a user; and a controller operatively coupled to the sensor unit and a drive coupled to the vehicle component, the controller being configured to: generate a control signal based on the touch command applied to the sensor unit; and cause the drive to alter a condition of the vehicle component in response to the control signal, wherein the vehicle component is a lock of a door and the sensor unit is a touch-sensitive sensor disposed on a handle of the door.

2. The system of claim 1, wherein the sensor unit is disposed on the vehicle component.

3. The system of claim 1, wherein the sensor unit and the vehicle component are integrally formed.

4. The system of claim 1, wherein the touch command indicates tapping by the user on the sensor unit.

5. The system of claim 1, wherein the touch command indicates a swiping by a user across the sensor unit.

6. The system of claim 1, wherein the touch command indicates pressing by the user on the sensor unit.

7. The system of claim 1, wherein generating a control signal includes selecting the control signal from among a plurality of pre-determined control signals corresponding to a plurality of pre-determined touch commands.

8. A vehicle including a system for intuitive control of a vehicle component, comprising: a vehicle component; a sensor unit associated with the vehicle component, the sensor unit configured to detect a touch command applied to the sensor unit by a user; and a controller operatively coupled to the sensor unit and a drive coupled to the vehicle component, the controller being configured to: generate a control signal based on the touch command applied to the sensor unit: and cause the drive to alter a condition of the vehicle component in response to the control signal; wherein the vehicle component is a lock of a door of the vehicle and the sensor unit is a touch-sensitive sensor disposed on a handle of the door.

9. A method of intuitively controlling a condition of a vehicle component, comprising: sensing a touch command applied to a sensor unit by a user; generating, by a controller, a control signal based on the touch command applied to the sensor unit; and causing a drive to alter the condition of the vehicle component in response to the control signal, wherein the vehicle component is a lock of a door and the sensor unit is a touch-sensitive sensor disposed on a handle of the door.

10. A non-transitory computer-readable medium having computer instructions stored thereon, wherein the computer instructions, when executed by a processor, perform a method of intuitively controlling a vehicle component, the method comprising: receiving a signal corresponding to a touch command applied to a sensor unit by a user; interpreting the signal corresponding to the touch command; and generating a control signal, wherein the control signal causes a drive to alter a condition of the vehicle component in response to the control signal, wherein the vehicle component is a lock of a door and the sensor unit is a touch-sensitive sensor disposed on a handle of the door.

* * * * *